(12) United States Patent
Wang

(10) Patent No.: US 10,205,659 B2
(45) Date of Patent: Feb. 12, 2019

(54) INFORMATION TRANSMISSION USING DIRECT HPCRF COMMUNICATIONS

(71) Applicant: Huawei Technologies Co., Ltd., Shenzhen, Guangdong (CN)

(72) Inventor: Shuo Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 15/094,641

(22) Filed: Apr. 8, 2016

(65) Prior Publication Data

US 2016/0226765 A1    Aug. 4, 2016

Related U.S. Application Data

(63) Continuation of application No. PCT/CN2013/085057, filed on Oct. 11, 2013.

(51) Int. Cl.
| | |
|---|---|
| H04B 7/00 | (2006.01) |
| H04L 12/741 | (2013.01) |
| H04L 29/08 | (2006.01) |
| H04L 29/12 | (2006.01) |
| H04L 12/14 | (2006.01) |
| H04M 15/00 | (2006.01) |

(Continued)

(52) U.S. Cl.
CPC .......... *H04L 45/74* (2013.01); *H04L 61/2007* (2013.01); *H04L 67/14* (2013.01); *H04L 12/1407* (2013.01); *H04L 45/72* (2013.01); *H04L 67/141* (2013.01); *H04L 67/143* (2013.01); *H04M 15/66* (2013.01); *H04W 4/00* (2013.01)

(58) Field of Classification Search
CPC ....... H04W 8/04; H04W 8/065; H04W 8/082; H04W 8/10; H04W 8/12
USPC ................. 370/310, 328, 401, 465
See application file for complete search history.

(56) References Cited

U.S. PATENT DOCUMENTS

| | | | | |
|---|---|---|---|---|
| 8,326,263 | B2 * | 12/2012 | Zhou ................ | H04L 12/1403 455/408 |
| 8,542,587 | B2 * | 9/2013 | Zhou ................ | H04W 28/24 370/230 |

(Continued)

FOREIGN PATENT DOCUMENTS

| | | |
|---|---|---|
| CN | 101035001 A | 9/2007 |
| CN | 101272534 A | 9/2008 |

(Continued)

*Primary Examiner* — Dmitry Levitan

(57) ABSTRACT

Embodiments of the present invention provide an information transmission method and apparatus, including: sending, by a routing apparatus, an IP address of the routing apparatus to an HPCRF entity via a VPCRF entity; receiving via the VPCRF entity, an IP address of the HPCRF entity sent by the HPCRF entity, the IP address of the HPCRF entity is sent after the HPCRF entity receives the IP address of the routing apparatus; and performing communication with the HPCRF entity according to the IP address of the HPCRF entity and the IP address of the routing apparatus. Therefore, information transmitted between the routing apparatus and the HPCRF entity no longer needs to be forwarded by the VPCRF entity, but instead, directly performed between the routing apparatus and the HPCRF entity, thereby reducing signaling overheads and saving network resources.

20 Claims, 6 Drawing Sheets

(51) Int. Cl.
*H04L 12/721* (2013.01)
*H04W 4/00* (2018.01)

(56) References Cited

U.S. PATENT DOCUMENTS

| | | | |
|---|---|---|---|
| 8,661,145 B2 * | 2/2014 | Zhou | H04L 12/14 709/228 |
| 8,745,244 B2 * | 6/2014 | Li | H04L 12/14 709/223 |
| 8,793,396 B2 * | 7/2014 | Zhou | H04L 12/14 709/238 |
| 9,380,446 B2 * | 6/2016 | Zhou | H04W 8/02 |
| 9,456,006 B2 * | 9/2016 | Bi | H04L 67/14 |
| 9,503,483 B2 * | 11/2016 | Martinez De La Cruz | H04L 65/1046 |
| 2011/0173332 A1 | 7/2011 | Li et al. | |
| 2012/0158977 A1 | 6/2012 | Zhou et al. | |
| 2013/0223290 A1 | 8/2013 | Zhou et al. | |

FOREIGN PATENT DOCUMENTS

| | | |
|---|---|---|
| CN | 101677437 A | 3/2010 |
| CN | 102014517 A | 4/2011 |
| CN | 102131175 A | 7/2011 |
| CN | 102469431 A | 5/2012 |
| CN | 101242655 B | 6/2012 |
| CN | 102761852 A | 10/2012 |
| WO | WO 2010/055402 A1 | 5/2010 |
| WO | 2011020514 A1 | 2/2011 |

\* cited by examiner

INFORMATION TRANSMISSION USING DIRECT HPCRF COMMUNICATIONS

CROSS-REFERENCE TO RELATED APPLICATIONS

This application is a continuation of International Application No. PCT/CN2013/085057, filed on Oct. 11, 2013, which is incorporated herein by in its entirety.

TECHNICAL FIELD

Embodiments of the present invention relate to the field of communications technologies, and in particular, to an information transmission method and apparatus.

BACKGROUND

With the continuous growth of Internet services, a mobile network operator needs to support application servers, so that a user obtains application services. In an existing network architecture of System Architecture Evolution (SAE for short) defined by the 3rd Generation Partnership Project (3GPP for short), an application server of a mobile network operator may interact with a policy and charging rules function (PCRF for short) entity by using an Rx interface that supports the Diameter protocol.

In the prior art, in a scenario in which user equipment (UE for short) and an application server are located at a visited location, when a network side or the application server triggers a PCRF entity to make a policy and charging control (PCC for short) rule decision, the network side or the application server first sends information to a visited policy and charging rules function (VPCRF for short) entity; then the VPCRF forwards the information from the network side to a home policy and charging rules function (HPCRF for short) entity by using an S9 interface; after making the PCC rule decision, the HPCRF entity sends a result of the PCC rule decision to the VPCRF entity by using the S9 interface; and then the VPCRF entity interacts with the application server.

However, the VPCRF entity does not make a decision, but implements a function of information forwarding, which causes a large quantity of signaling overheads and a waste of network resources.

SUMMARY

Embodiments of the present invention provide an information transmission method and apparatus, which is used to reduce information transmission between a VPCRF entity and an HPCRF entity, and reduce signaling overheads, so as to save network resources.

According to a first aspect, an embodiment of the present invention provides an information transmission method, including:

sending, by a routing apparatus, an Internet IP address of the routing apparatus to a home policy and charging rules function HPCRF entity via a visited policy and charging rules function VPCRF entity;

receiving, by the routing apparatus via the VPCRF entity, an IP address of the HPCRF entity sent by the HPCRF entity, where the IP address of the HPCRF entity is sent after the HPCRF entity receives the IP address of the routing apparatus; and performing, by the routing apparatus, communication with the HPCRF entity according to the IP address of the HPCRF entity and the IP address of the routing apparatus.

According to a second aspect, an embodiment of the present invention further provides an information transmission method, including:

receiving, by a home policy and charging rules function HPCRF entity via a visited policy and charging rules function VPCRF entity, an IP address of a routing apparatus sent by the routing apparatus;

sending, by the HPCRF entity, an IP address of the HPCRF entity to the routing apparatus via the VPCRF entity; and performing, by the HPCRF entity, communication with the routing apparatus according to the IP address of the routing apparatus and the IP address of the HPCRF entity.

According to a third aspect, an embodiment of the present invention provides a routing apparatus, including:

a sending unit, configured to send an Internet IP address of the routing apparatus to a home policy and charging rules function HPCRF entity via a visited policy and charging rules function VPCRF entity;

a receiving unit, configured to receive, via the VPCRF entity, an IP address of the HPCRF entity sent by the HPCRF entity, where the IP address of the HPCRF entity is sent after the HPCRF entity receives the IP address of the routing apparatus; and a processing unit, configured to perform communication with the HPCRF entity according to the IP address of the HPCRF entity and the IP address of the routing apparatus.

According to a fourth aspect, an embodiment of the present invention provides an HPCRF entity, including:

a receiving unit, configured to receive, via a visited policy and charging rules function VPCRF entity, an IP address of a routing apparatus sent by the routing apparatus;

a sending unit, configured to send an IP address of the HPCRF entity to the routing apparatus via the VPCRF entity; and a processing unit, configured to perform communication with the routing apparatus according to the IP address of the routing apparatus and the IP address of the HPCRF entity.

According to the information transmission method and apparatus provided in the embodiments of the present invention, a routing apparatus sends an IP address of the routing apparatus to an HPCRF entity via a VPCRF entity; receives, via the VPCRF entity, an IP address of the HPCRF entity sent by the HPCRF entity, where the IP address of the HPCRF entity is sent after the HPCRF entity receives the IP address of the routing apparatus; and then performs communication with the HPCRF entity according to the IP address of the HPCRF entity and the IP address of the routing apparatus. Therefore, it may be implemented that information transmitted between the routing apparatus and the HPCRF entity no longer needs to be forwarded by the VPCRF entity, but instead, information transmission may be directly performed between the routing apparatus and the HPCRF entity, thereby reducing the amount of information transmitted between the VPCRF entity and the HPCRF entity, so as to reduce signaling overheads and save network resources.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
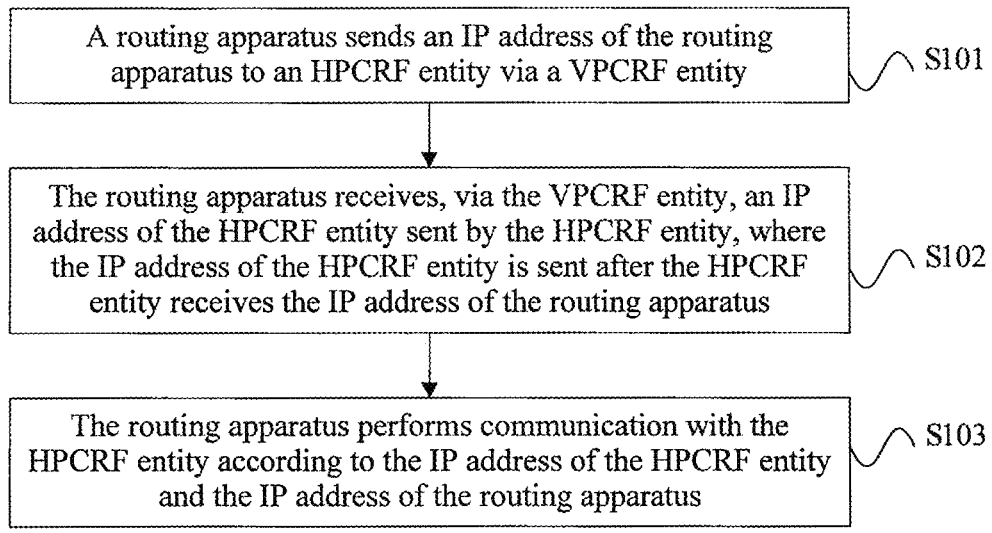
FIG. 1 is a flowchart of Embodiment 1 of an information transmission method according to the present invention.

FIG. 1 is a flowchart of Embodiment 1 of an information transmission method according to the present invention. As shown in FIG. 1, the method in this embodiment may include the following steps:

S101. A routing apparatus sends an Internet Protocol (IP for short) address of the routing apparatus to an HPCRF entity via a VPCRF entity.

In this embodiment, the routing apparatus may send the IP address of the routing apparatus to the VPCRF entity, and then the VPCRF entity sends the received IP address of the routing apparatus to the HPCRF entity by using an existing S9 interface, so as to implement that the routing apparatus sends the IP address of the routing apparatus to the HPCRF entity via the VPCRF entity.

In the prior art, an application server sends information to an HPCRF entity mainly by sending the information from the application server to a VPCRF entity via a Diameter routing agent, where the VPCRF entity sends the information from the Diameter routing agent to the HPCRF entity. Therefore, in this embodiment, it may be implemented, based on a transmission procedure of the Diameter routing agent in the prior art, that the routing apparatus sends the IP address of the routing apparatus to the HPCRF entity via the VPCRF entity.

S102. The routing apparatus receives, via the VPCRF entity, an IP address of the HPCRF entity sent by the HPCRF entity, where the IP address of the HPCRF entity is sent after the HPCRF entity receives the IP address of the routing apparatus.

In this embodiment, the routing apparatus may receive the IP address of the HPCRF entity sent by the VPCRF entity, where the IP address of the HPCRF entity is sent, by using the existing S9 interface, to the VPCRF entity after the HPCRF entity receives, by using the existing S9 interface, the IP address of the routing apparatus sent by the VPCRF entity, so as to implement that the routing apparatus receives, via the VPCRF entity, the IP address of the HPCRF entity sent by the HPCRF entity.

In the prior art, an HPCRF entity sends information to an application server mainly by sending the information from the HPCRF entity to a Diameter routing agent via a VPCRF entity, where the Diameter routing agent sends the information from the VPCRF entity to the application server. Therefore, in this embodiment, it may be implemented, based on the transmission procedure of the Diameter routing agent in the prior art, that the routing apparatus receives, via the VPCRF entity, the IP address of the HPCRF entity sent by the HPCRF entity.

S103. The routing apparatus performs communication with the HPCRF entity according to the IP address of the HPCRF entity and the IP address of the routing apparatus.

In this embodiment, after the routing apparatus receives the IP address of the HPCRF entity, the routing apparatus may directly communicate with the HPCRF entity according to the IP address of the HPCRF entity and the IP address of the routing apparatus, so that the routing apparatus does not need to communicate with the HPCRF entity via the VPCRF entity.

According to the information transmission method provided in Embodiment 1 of the present invention, a routing apparatus sends an IP address of the routing apparatus to an HPCRF entity via a VPCRF entity; receives, via the VPCRF entity, an IP address of the HPCRF entity sent by the HPCRF entity, where the IP address of the HPCRF entity is sent after the HPCRF entity receives the IP address of the routing apparatus; and then performs communication with the HPCRF entity according to the IP address of the HPCRF entity and the IP address of the routing apparatus. Therefore, it may be implemented that information transmitted between the routing apparatus and the HPCRF entity no longer needs to be forwarded by the VPCRF entity, but instead, information transmission may be directly performed between the routing apparatus and the HPCRF entity, thereby reducing the amount of information transmitted between the VPCRF entity and the HPCRF entity, so as to reduce signaling overheads and save network resources.

Based on Embodiment 1 of the information transmission method according to the present invention, optionally, that the routing apparatus performs communication with the HPCRF entity according to the IP address of the HPCRF entity and the IP address of the routing apparatus may include:

the routing apparatus sends information to the HPCRF entity according to the IP address of the HPCRF entity, and accordingly, the HPCRF entity receives the information that is sent according to the IP address of the HPCRF entity by the routing apparatus; and/or the routing apparatus receives information that is sent according to the IP address of the routing apparatus by the HPCRF entity, where the information is sent by the HPCRF entity to the routing apparatus according to the IP address of the routing apparatus.

Optionally, that the routing apparatus sends information to the HPCRF entity according to the IP address of the HPCRF entity includes: the routing apparatus sends the information to the HPCRF entity according to the IP address of the HPCRF entity in a change process of an application function (AF for short) session. That the routing apparatus receives information that is sent according to the IP address of the routing apparatus by the HPCRF entity includes: the routing apparatus receives, in the change process of the AF session, the information that is sent according to the IP address of the routing apparatus by the HPCRF entity.

Optionally, that the routing apparatus sends the IP address of the routing apparatus to the HPCRF entity via the VPCRF entity includes: the routing apparatus sends the IP address of the routing apparatus to the HPCRF entity according to a setup process of the AF session via the VPCRF entity. That the routing apparatus receives, via the VPCRF entity, an IP address of the HPCRF entity sent by the HPCRF entity includes: the routing apparatus receives, according to the setup process of the AF session via the VPCRF entity, the IP address of the HPCRF entity sent by the HPCRF entity.

Figure 2:
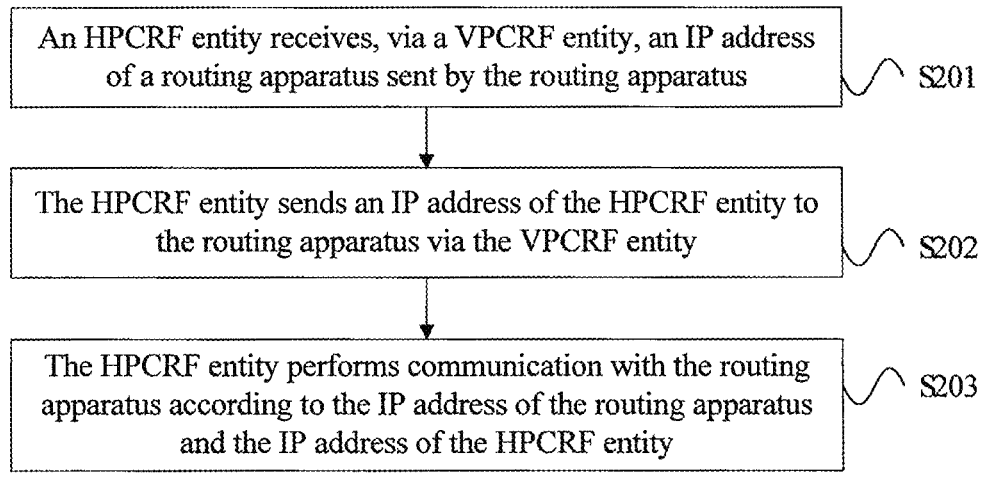
FIG. 2 is a flowchart of Embodiment 2 of an information transmission method according to the present invention.

FIG. 2 is a flowchart of Embodiment 2 of an information transmission method according to the present invention. As shown in FIG. 2, the method in this embodiment may include the following steps:

S201. An HPCRF entity receives, via a VPCRF entity, an IP address of a routing apparatus sent by the routing apparatus.

In this embodiment, the HPCRF entity may receive, by using an existing S9 interface, the IP address of the routing apparatus sent by the VPCRF entity, where the IP address of the routing apparatus is sent by the routing apparatus to the VPCRF entity, so as to implement that the HPCRF entity receives, via the VPCRF entity, the IP address of the routing apparatus sent by the routing apparatus.

In the prior art, an HPCRF entity receives information sent by an application server, mainly by sending the information from the application server to a VPCRF entity via a Diameter routing agent, where the VPCRF entity sends the information from the Diameter routing agent to the HPCRF entity. Therefore, in this embodiment, it may be implemented, based on a transmission procedure of the HPCRF entity in the prior art, that the HPCRF entity receives, via the VPCRF entity, the IP address of the routing apparatus sent by the routing apparatus.

S202. The HPCRF entity sends an IP address of the HPCRF entity to the routing apparatus via the VPCRF entity.

In this embodiment, after the HPCRF entity receives the IP address of the routing apparatus, the HPCRF entity may send the IP address of the HPCRF entity to the VPCRF entity by using the existing S9 interface, then the VPCRF entity sends the received IP address of the HPCRF entity to the routing apparatus, so as to implement that the HPCRF entity sends the IP address of the HPCRF entity to the routing apparatus via the VPCRF entity.

In the prior art, an HPCRF entity sends information to an application server mainly by sending the information from the HPCRF entity to a Diameter routing agent via a VPCRF entity, where the Diameter routing agent sends the information from the VPCRF entity to the application server. Therefore, in this embodiment, it may be implemented, based on a transmission procedure of the Diameter routing agent in the prior art, that the HPCRF entity sends the IP address of the HPCRF entity to the routing apparatus via the VPCRF entity.

S203. The HPCRF entity performs communication with the routing apparatus according to the IP address of the routing apparatus and the IP address of the HPCRF entity.

In this embodiment, after the HPCRF entity receives the IP address of the routing apparatus and sends the IP address of the HPCRF entity to the routing apparatus, the HPCRF entity may directly communicate with the routing apparatus according to the IP address of the routing apparatus and the IP address of the HPCRF entity, so that the HPCRF entity does not need to communicate with the routing apparatus via the VPCRF entity.

According to the information transmission method provided in Embodiment 2 of the present invention, an HPCRF entity receives, via a VPCRF entity, an IP address of a routing apparatus sent by the routing apparatus, sends an IP address of the HPCRF entity to the routing apparatus via the VPCRF entity, and then performs communication with the routing apparatus according to the IP address of the routing apparatus and the IP address of the HPCRF entity. Therefore, it may be implemented that information transmitted between the HPCRF entity and the routing apparatus no longer needs to be forwarded by the VPCRF entity, but instead, information transmission may be directly performed between the HPCRF entity and the routing apparatus, thereby reducing the amount of information transmitted between the VPCRF entity and the HPCRF entity, so as to reduce signaling overheads and save network resources.

Based on Embodiment 2 of the information transmission method according to the present invention, optionally, that the HPCRF entity performs communication with the routing apparatus according to the IP address of the routing apparatus and the IP address of the HPCRF entity includes: the HPCRF entity sends information to the routing apparatus according to the IP address of the routing apparatus, and/or the HPCRF entity receives information that is sent according to the IP address of the HPCRF entity by the routing apparatus.

Optionally, that the HPCRF entity sends information to the routing apparatus according to the IP address of the routing apparatus includes: the HPCRF entity sends the information to the routing apparatus according to the IP address of the routing apparatus in a change process of an AF session. That the HPCRF entity receives information that is sent according to the IP address of the HPCRF entity by the routing apparatus includes: the HPCRF entity receives, in the change process of the AF session, the information that is sent according to the IP address of the HPCRF entity by the routing apparatus.

Optionally, that the HPCRF entity receives, via the VPCRF entity, the IP address of the routing apparatus sent by the routing apparatus includes: the HPCRF entity receives, according to a setup process of the AF session via the VPCRF entity, the IP address of the routing apparatus sent by the routing apparatus. That the HPCRF entity sends an IP address of the HPCRF entity to the routing apparatus via the VPCRF entity includes: the HPCRF entity sends the IP address of the HPCRF entity to the routing apparatus according to the setup process of the AF session via the VPCRF entity.

Figure 3:
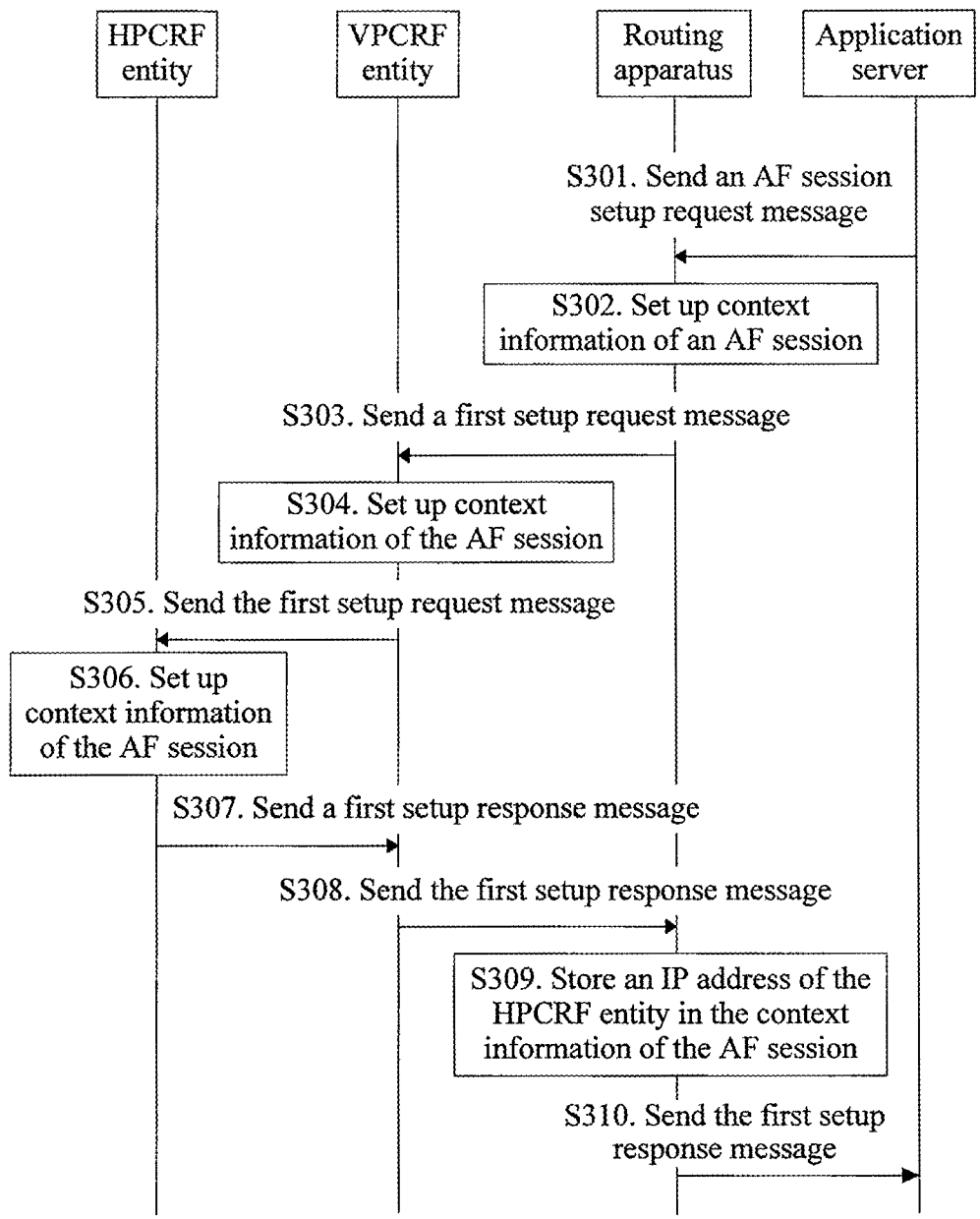
FIG. 3 is a flowchart of Embodiment 3 of an information transmission method according to the present invention.

FIG. 3 is a flowchart of Embodiment 3 of an information transmission method according to the present invention. As shown in FIG. 3, based on the embodiment of the information transmission method shown in FIG. 1 or FIG. 2, in this embodiment, an AF session setup process is used to describe that a routing apparatus sends an IP address of the routing apparatus to an HPCRF entity via a VPCRF entity, and the HPCRF entity sends an IP address of the HPCRF entity to the routing apparatus via the VPCRF entity. The method in this embodiment may include the following steps:

S301. Send an AF session setup request message.

In this embodiment, an application server sends the AF session setup request message to the routing apparatus, where the application server may be an application server of a mobile network operator, or an application server belonging to a third party. The application server may be located at a visited location of UE, or located at another area that is not a home location of the UE. The routing apparatus may be configured by the mobile network operator and have a routing and forwarding function, and furthermore, may further have another function such as protocol conversion, where the protocol conversion may be function conversion between the Diameter protocol and a non-Diameter protocol. For example, the protocol conversion may be conversion between the Diameter protocol and an Extensible Markup Language (eXtensible Markup Language, XML for short)-based protocol, or may be conversion between the Diameter protocol and the Hypertext Transfer Protocol (HTTP for short). It should be noted that the Diameter protocol in this embodiment is the same as the Diameter protocol in the prior art, and details are not further described in this embodiment of the present invention. The application server receives internal or external triggering, and sends an AF session setup request message to the routing apparatus that is connected to the application server; a trigger condition for sending the AF session setup request message by the application server is similar to a trigger condition for setting up an AF session in the prior art, and details are not further described in this embodiment. If the application server is an application server of the mobile network operator, the AF session setup request message sent by the application server is an application authorization request (AAR for short) message that supports the Diameter protocol; or if the application server is an application server belonging to a third party, the AF session setup request message sent by the application server is an AF session setup request message that supports the non-Diameter protocol.

A connection between the routing apparatus and the application server is preconfigured by negotiation between the mobile network operator and a provider of the application server. The AF session setup request message is used to instruct setup of an AF session, and the AF session setup request message includes information required for setting up the AF session. Optionally, the AF session setup request message may include at least one type of the following information: identifier information of an AF, an IP address of a service IP flow requested by UE, a port number of the service IP flow requested by the UE, media information of the IP flow requested by the UE, and an IP address of the UE, where the identifier information of the AF may be a uniform resource locator (URL for short) or an identity (ID for short) of the AF.

S302. Set up context information of an AF session.

In this embodiment, after the routing apparatus receives the AF session setup request message sent by the application server, the routing apparatus sets up the context information of the AF session, stores, in the context information of the AF session, information carried in the AF session setup request message, and allocates an AF session identity for the context information of the AF session.

S303. Send a first setup request message.

In this embodiment, the routing apparatus sends the first setup request message to the VPCRF entity according to the AF session setup request message.

Optionally, a mapping table of IP address segments and VPCRF entity IP addresses is preconfigured on the routing apparatus; the routing apparatus may determine, according to an IP address of the UE, an IP address segment to which the IP address of the UE belongs, and determine, according to the mapping table of IP address segments and VPCRF entity IP addresses, a VPCRF entity IP address that is allocated for the IP address segment; then the routing apparatus sends the first setup request message to the VPCRF entity according to the VPCRF entity IP address, so that the VPCRF entity forwards the first setup request message to the HPCRF entity, where the first setup request message includes the information required for setting up the AF session and an IP address of the routing apparatus, so that the HPCRF entity obtains the IP address of the routing apparatus.

Optionally, after the routing apparatus sets up the context information of the AF session according to the AF session setup request message and before the routing apparatus sends the first setup request message to the VPCRF entity, the method further includes: determining, by the routing apparatus, whether the AF session setup request message sent by the application server supports the Diameter protocol. If the routing apparatus determines that the AF session setup request message supports the Diameter protocol, the AF session setup request message is an AAR message that supports the Diameter protocol, and the routing apparatus adds the IP address of the routing apparatus to the AAR message that supports the Diameter protocol, and sends, to the VPCRF entity, the AAR message that includes the IP address of the routing apparatus. If the routing apparatus determines that the AF session setup request message does not support the Diameter protocol, the AF session setup request message is an AF session setup request message that supports the non-Diameter protocol, and the routing apparatus converts the AF session setup request message that supports the non-Diameter protocol into the AAR message that supports the Diameter protocol, adds the IP address of the routing apparatus to the AAR message obtained by conversion, and sends, to the VPCRF entity, the AAR message that includes the IP address of the routing apparatus. The routing apparatus further records a non-Diameter protocol type supported by the application server. The first setup request message in this embodiment is an AAR message that includes the IP address of the routing apparatus and supports the Diameter protocol.

Optionally, the first setup request message may further include an identity of the routing apparatus.

S304. Set up context information of the AF session.

In this embodiment, after receiving the first setup request message sent by the routing apparatus, the VPCRF entity stores, according to the first setup request message, information carried in the first setup request message, and sets up the context information of the AF session.

S305. Send the first setup request message.

In this embodiment, the VPCRF entity further sends the first setup request message to the HPCRF entity, that is, the VPCRF entity sends the AAR message that includes the IP address of the routing apparatus and supports the Diameter protocol to the HPCRF entity by using an existing S9 interface.

S306. Set up context information of the AF session.

In this embodiment, after receiving the first setup request message sent by the VPCRF entity, the HPCRF entity stores, according to the first setup request message, the information required for setting up the AF session and the IP address of the routing apparatus that are carried in the first setup request message, and sets up the context information of the AF session, where the context information of the AF session includes the IP address of the routing apparatus. The HPCRF entity further makes a PCC rule decision, and may store a decided PCC rule in the context information of the AF session. The HPCRF entity may make the PCC rule decision according to a static or dynamic policy, where the static policy or dynamic policy is consistent with that in the prior art, and details are not described in this embodiment of the present invention. If the HPCRF entity requires subscription data to participate in making the PCC decision but there is no related subscription data in the HPCRF entity, the HPCRF entity may send an SPR subscription information acquiring request message to a subscription profile repository (SPR for short) to acquire the related subscription data; the SPR receives the SPR subscription information acquiring request message sent by the HPCRF entity, and sends an SPR subscription information response message to the HPCRF entity, where the SPR subscription information response message carries subscription data information of a subscriber.

S307. Send a first setup response message.

In this embodiment, after the HPCRF entity sets up the context information of the AF session, the HPCRF entity sends the first setup response message to the VPCRF entity, so that the VPCRF entity forwards the first setup response message to the routing apparatus, and then the routing apparatus sends the first setup response message to the application server, so as to complete the setup process of the AF session. The first setup response message includes the IP address of the HPCRF entity, so that the routing apparatus acquires the IP address of the HPCRF entity; optionally, the first setup response message further includes an identity of the HPCRF entity; optionally, the first setup response message further includes the decided PCC rule, so that the VPCRF entity acquires the decided PCC rule, and the VPCRF entity may interact with a policy and charging enforcement function (PCEF for short) entity according to the PCC rule, and the PCEF entity sets up and executes the PCC rule. The first setup response message in this embodiment is an application authorization answer (AAA for short) message that includes the IP address of the HPCRF entity and supports the Diameter protocol.

S308. Send the first setup response message.

In this embodiment, after receiving the first setup response message that is sent by the HPCRF entity by using the S9 interface, the VPCRF entity may determine the IP address of the routing apparatus in the context information of the AF session, and send the first setup response message to the routing apparatus.

S309. Store the IP address of the HPCRF entity in the context information of the AF session.

In this embodiment, after receiving the first setup response message sent by the VPCRF entity, the routing apparatus stores, in the context information of the AF session, the IP address the HPCRF entity carried in the first setup response message.

S310. Send the first setup response message.

In this embodiment, the routing apparatus sends the first setup response message to the application server, and the first setup response message sent by the routing apparatus to the application server may not include the IP address of the HPCRF entity. If the application server supports the Diameter protocol, the routing apparatus directly sends the first setup response message to the application server, that is, the routing apparatus sends the AAA message that supports the Diameter protocol to the application server. If the application server does not support the Diameter protocol, the routing apparatus converts, according to the non-Diameter protocol type supported by the application server, the AAA message that supports the Diameter protocol into an AF session setup response message that supports the non-Diameter protocol, and sends the AF session setup response message obtained by conversion to the application server, so as to complete the setup process of the AF session.

According to the information transmission method provided in Embodiment 3 of the present invention, a routing apparatus sends a first setup request message to an HPCRF entity via a VPCRF entity, so that the HPCRF entity acquires an IP address of the routing apparatus, the HPCRF entity sends a first setup response message to the routing apparatus via the VPCRF entity, so that the routing apparatus acquires an IP address of the HPCRF entity, then the routing apparatus and the HPCRF entity may perform communication according to the IP address of the HPCRF entity and the IP address of the routing apparatus. Therefore, it may be implemented that information transmitted between the HPCRF entity and the routing apparatus no longer needs to be forwarded by the VPCRF entity, but instead, information transmission may be directly performed between the HPCRF entity and the routing apparatus, thereby reducing the amount of information transmitted between the VPCRF entity and the HPCRF entity, so as to reduce signaling overheads and save network resources.

Figure 4:
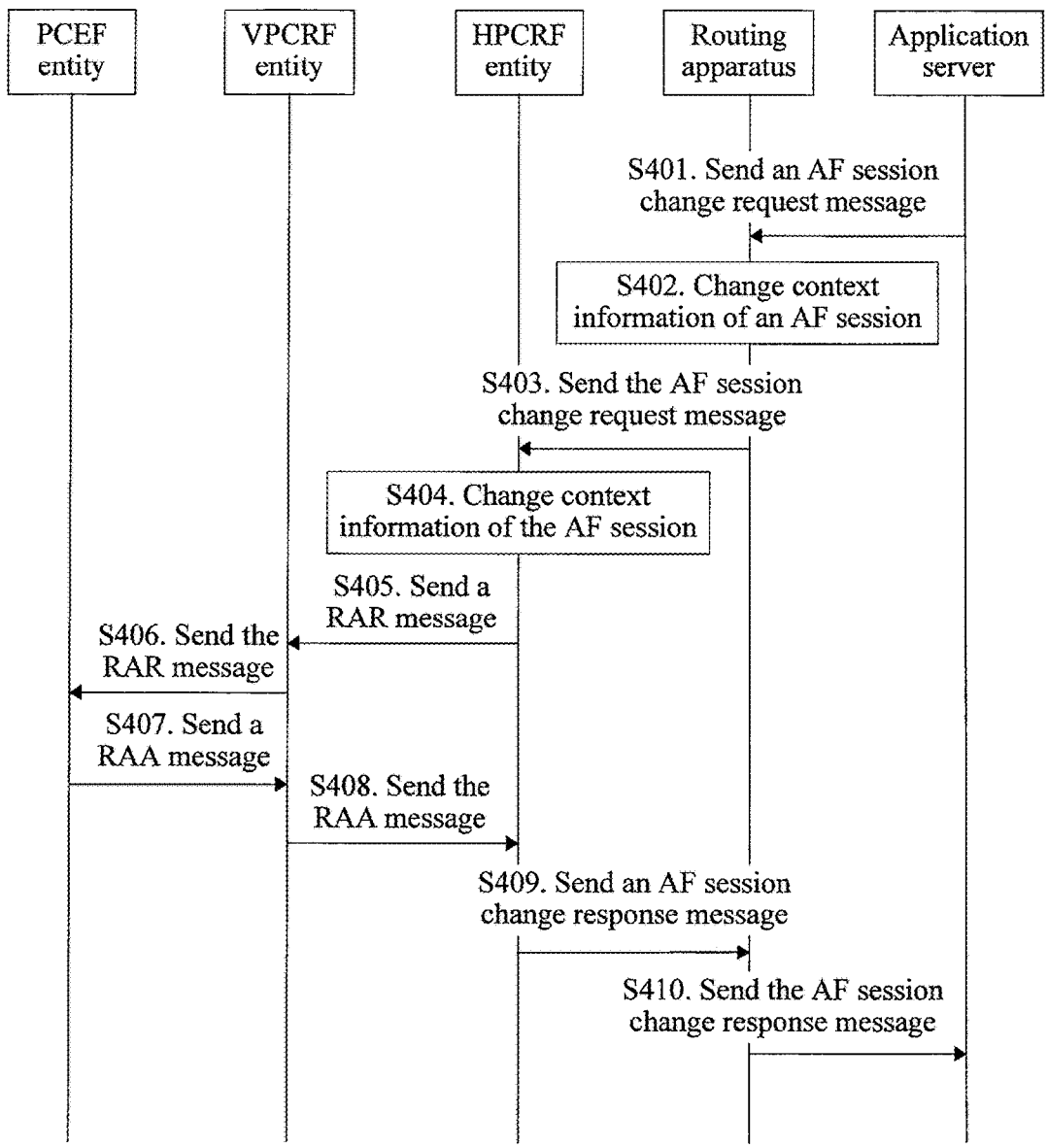
FIG. 4 is a flowchart of Embodiment 4 of an information transmission method according to the present invention.

FIG. 4 is a flowchart of Embodiment 4 of an information transmission method according to the present invention. As shown in FIG. 4, based on any one of the embodiments of the information transmission methods shown in FIG. 1 to FIG. 3, in this embodiment, an AF session change process is used to describe a process in which a routing apparatus and an HPCRF entity perform transmission according to an IP address of the routing apparatus and an IP address of the HPCRF entity. The method in this embodiment may include the following steps:

S401. Send an AF session change request message.

In this embodiment, an application server sends the AF session change request message to the routing apparatus, where the application server may be an application server of a mobile network operator, or an application server belonging to a third party. The application server may be located at a visited location of UE, or located at another area that is not a home location of the UE. The routing apparatus may be configured by the mobile network operator and have a routing and forwarding function, and furthermore, may further have another function such as protocol conversion, where the protocol conversion may be function conversion between the Diameter protocol and a non-Diameter protocol. For example, the protocol conversion may be conversion between the Diameter protocol and an XML-based protocol, or may be conversion between the Diameter protocol and the HTTP. It should be noted that, the Diameter protocol in this embodiment is consistent with the Diameter protocol in the prior art, and details are not described in this embodiment of the present invention. The application server receives internal or external triggering, and sends the AF session change request message to the routing apparatus that is connected to the application server; a trigger condition for sending the AF session change request message by the application server is similar to a trigger condition for changing an AF session in the prior art, and details are not further described in this embodiment. The AF session change request message may be an AF session modification request message or AF session termination request message. If the application server is an application server of the mobile network operator, the AF session change request message sent by the application server is an AF session change request message that supports the Diameter protocol. For example, an AF session modification request message is an AAR message that supports the Diameter protocol, and an AF session termination request message is a session-termination-request (STR for short) message that supports the Diameter protocol. If the application server is an application server belonging to a third party, the AF session change request message sent by the application server may be an AF session change request message that supports the non-Diameter protocol. For example, an AF session modification request message is an AF session modification request message that supports the non-Diameter protocol, and an AF session termination request message is an AF session termination request message that supports the non-Diameter protocol.

A connection between the routing apparatus and the application server is preconfigured by negotiation between the mobile network operator and a provider of the application server. The AF session change request message is used to instruct change of an AF session, and the AF session change request message includes information required for changing the AF session. Optionally, the AF session change request message may include at least one type of the following information: an identity of the AF session, identifier information of an AF, an IP address of a service IP flow requested by UE, a port number of the IP flow requested by the UE, media information of the IP flow requested by the UE, and an IP address of the UE, where the identifier information of the AF may be a URL or an ID of the AF.

S402. Change context information of the AF session.

In this embodiment, after the routing apparatus receives the AF session change request message sent by the application server, the routing apparatus changes the context information of the AF session according to the AF session change request message, for example, modifies the context information of the AF session, or deletes the context information of the AF session.

S403. Send the AF session change request message.

In this embodiment, the routing apparatus sends the AF session change request message to the HPCRF entity according to the AF session change request message, where the AF session change request message is sent by the routing apparatus according to a change, triggered by the application server, of the AF session.

Specifically, the routing apparatus determines, according to the AF session change request message, the context information of the AF session that needs to be changed, and acquires the IP address of the HPCRF entity stored in the context information of the AF session; then the routing apparatus sends the AF session change request message to the HPCRF entity according to the IP address of the HPCRF entity, so that the HPCRF entity changes the AF session according to the AF session change request message.

Optionally, before the routing apparatus sends the AF session change request message to the HPCRF entity, the method further includes: determining, by the routing apparatus, whether the AF session change request message sent by the application server supports the Diameter protocol. If the routing apparatus determines that the AF session change request message supports the Diameter protocol, for example, the AF session change request message is an AAR message that supports the Diameter protocol or an STR message that supports the Diameter protocol, the routing apparatus may forward the AF session change request message that supports the Diameter protocol to the HPCRF entity. If the routing apparatus determines that the AF session change request message does not support the Diameter protocol, for example, the AF session change request message is an AF session modification request message that supports the non-Diameter protocol or an AF session termination request message that supports the non-Diameter protocol, the routing apparatus converts the AF session change request message that supports the non-Diameter protocol into the AF session change request message that supports the Diameter protocol.

S404. Change context information of the AF session.

In this embodiment, after receiving the AF session change request message sent by the routing apparatus, the HPCRF entity changes the context information of the AF session according to the AF session change request message. If the AF session change request is an AAR message that is used to instruct modification to the AF session and supports the Diameter protocol, the HPCRF entity modifies the context information of the AF session according to information that is required for modifying the AF session and carried in the AAR message. The HPCRF entity may further make a PCC rule decision according to the AAR message, where the HPCRF entity may add a PCC rule to, modify a PCC rule in, or delete a PCC rule from the context information of the AF session. If the AF session change request is an STR message that is used to instruct termination of the AF session and supports the Diameter protocol, the HPCRF entity makes a PCC rule decision according to information that is required for terminating the AF session and carried in the STR message, to delete the PCC rule from the context information of the AF session.

S405. Send a re-authorization request (RAR for short) message.

S406. Send the RAR message.

In this embodiment, the HPCRF entity sends the RAR message to a VPCRF entity according to a decided PCC rule, and the VPCRF entity forwards the RAR message to a PCEF entity, so that the PCEF entity sets up the PCC rule, or modifies the PCC rule, or removes the PCC rule.

S407. Send a re-authorization answer (RAA for short) message.

S408. Send the RAA message.

In this embodiment, after the PCEF entity sets up the PCC rule, modifies the PCC rule, or removes the PCC rule according to the RAR message, the PCEF entity sends the RAA message to the VPCRF entity, and then the VPCRF entity forwards the RAA message to the HPCRF entity. If the application server triggers termination of the AF session, the VPCRF entity deletes the context information of the AF session from the VPCRF entity.

S409. Send an AF session change response message.

In this embodiment, the HPCRF entity may determine the IP address of the routing apparatus in the context information of the AF session, and then the HPCRF entity sends the AF session change response message to the routing apparatus according to the IP address of the routing apparatus. The AF session change response message may be an AAA message that supports the Diameter protocol or a session-termination answer (STA for short) message that supports the Diameter protocol. If the STA message is sent by the HPCRF entity to the routing apparatus, the HPCRF entity deletes the context information of the AF session.

S410. Send the AF session change response message.

In this embodiment, after receiving the AF session change response message sent by the HPCRF entity, the routing apparatus sends the AF session change response message to the application server. If the application server supports the Diameter protocol, the routing apparatus directly sends the AF session change response message to the application server, that is, the routing apparatus sends the AAA message that supports the Diameter protocol or the STA message that supports the Diameter protocol to the application server. If the application server does not support the Diameter protocol, the routing apparatus converts, according to a non-Diameter protocol type supported by the application server, the AAA message that supports the Diameter protocol or the STA message that supports the Diameter protocol into an AF session modification response message or AF session termination response message that supports the non-Diameter protocol, and then sends the AF session change response message obtained by conversion to the application server, so as to complete the change process of the AF session.

According to the information transmission method provided in Embodiment 4 of the present invention, after an HPCRF entity acquires an IP address of a routing apparatus via a VPCRF entity, and the routing apparatus acquires an IP address of the HPCRF entity via the VPCRF entity, the routing apparatus may send an AF session change request message to the HPCRF entity according to the IP address of the HPCRF entity, and the HPCRF entity may receive the AF session change request message that is sent according to the IP address of the HPCRF entity by the routing apparatus; the HPCRF entity may send an AF session change response message to the routing apparatus according to the IP address of the routing apparatus, and the routing apparatus may receive the AF session change response message that is sent according to the IP address of the routing apparatus by the HPCRF entity. Therefore, it may be implemented that information transmitted between the HPCRF entity and the routing apparatus no longer needs to be forwarded by the VPCRF entity, but instead, information transmission may be directly performed between the HPCRF entity and the routing apparatus, thereby reducing the amount of information transmitted between the VPCRF entity and the HPCRF entity, so as to reduce signaling overheads and save network resources.

Figure 5:
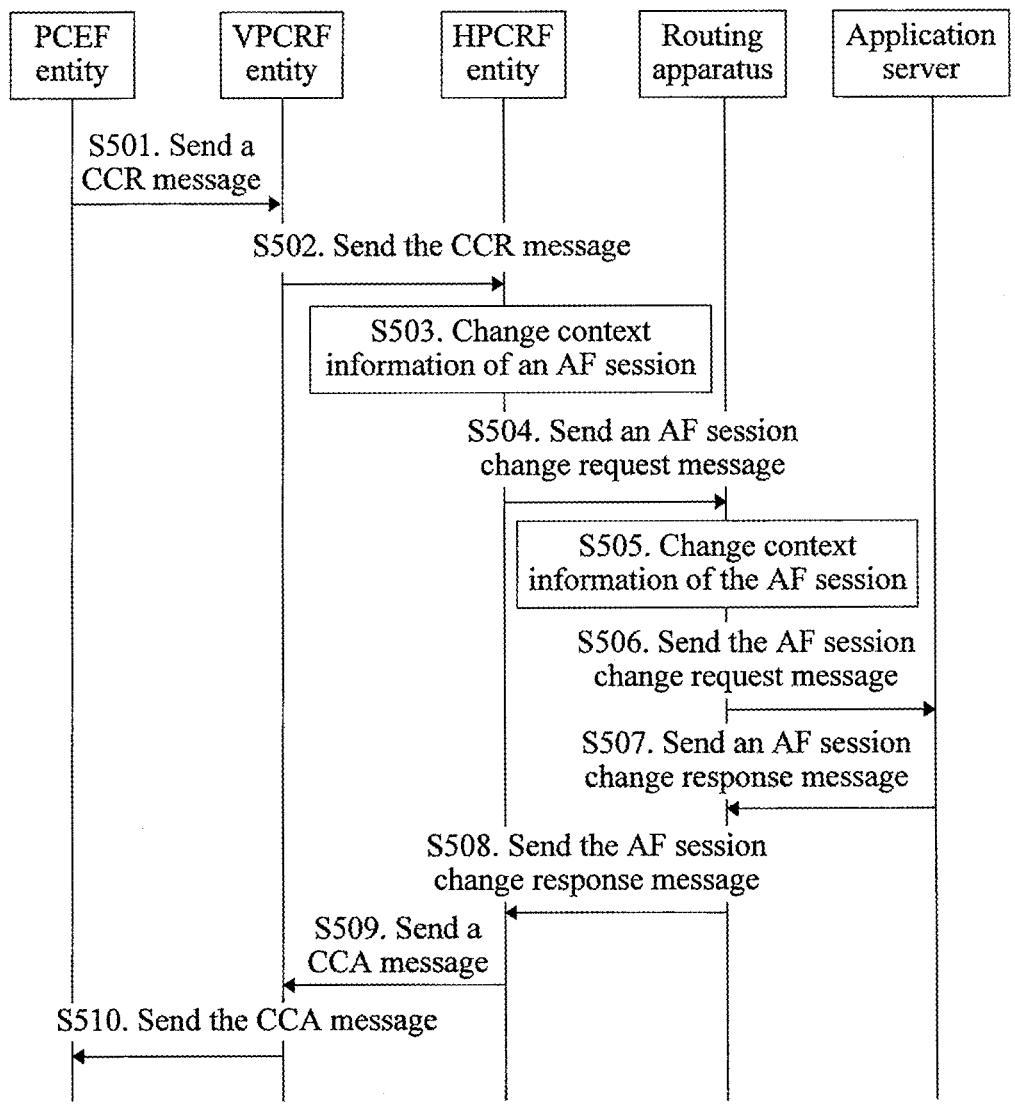
FIG. 5 is a flowchart of Embodiment 5 of an information transmission method according to the present invention.

FIG. 5 is a flowchart of Embodiment 5 of an information transmission method according to the present invention. As shown in FIG. 5, based on any one of the embodiments of the information transmission methods shown in FIG. 1 to FIG. 4, in this embodiment, an AF session change process is used to describe a process in which a routing apparatus and an HPCRF entity perform transmission according to an IP address of the routing apparatus and an IP address of the HPCRF entity. The method in this embodiment may include the following steps:

S501. Send a credit control request (CCR for short) message.

In this embodiment, a PCEF entity sends the CCR message to a VPCRF entity: the PCEF entity receives an internal or external trigger or request, and sends an AF session change request message to the routing apparatus that connects to the PCEF entity. A trigger condition for sending the AF session change request message by the PCEF entity is similar to a trigger condition for changing an AF session in the prior art, and details are not further described in this embodiment. The AF session change request message may be an AF session modification request message, an AF session termination request message, or an AF session bearer deletion request message. The AF session change request message is used to instruct change of an AF session, and the AF session change request message includes information required for changing the AF session. Optionally, the AF session change request message may include at least one type of the following information: an identity of the AF session, identifier information of an AF, an IP address of a service IP flow requested by UE, a port number of the IP flow requested by the UE, media information of the IP flow requested by the UE, and an IP address of the UE, where the identifier information of the AF may be a URL or an ID of the AF.

S502. Send the CCR message.

In this embodiment, after the VPCRF entity receives the CCR message sent by the PCEF entity, the VPCRF entity forwards the CCR message to the HPCRF entity by using an existing S9 interface, and the VPCRF entity may further change context information of the AF session according to the CCR message.

S503. Change context information of the AF session.

In this embodiment, after receiving the AF session change request message sent by the VPCRF entity, the HPCRF entity changes the context information of the AF session according to the AF session change request message. If the CCR message is used to instruct modification to the AF session, the HPCRF entity may modify the context information of the AF session. If the CCR message is used to instruct deletion of a bearer of the AF session, the HPCRF entity may delete information corresponding to a bearer in the context information of the AF session. When the change request is an AAR message that is used to instruct modification to the AF session and supports the Diameter protocol, the HPCRF entity may further make a PCC rule decision according to the AAR message, where the HPCRF entity may add a PCC rule to, modify a PCC rule in, or delete a PCC rule from the context information of the AF session.

S504. Send an AF session change request message.

In this embodiment, the HPCRF entity may determine the IP address of the routing apparatus in the context information of the AF session, and then the HPCRF entity sends the AF session change request message to the routing apparatus according to the IP address of the routing apparatus, where the AF session change request message is sent by the HPCRF entity according to a change that is of the AF session and triggered by the PCEF entity. If the PCEF entity triggers a modification to the AF session, the AF session change request message may be a RAR message that supports the Diameter protocol. If the PCEF entity triggers deletion of the bearer of the AF session, the AF session change request message may be an ASR (Abort-Session Request) message that supports the Diameter protocol. If the PCEF entity triggers termination of the AF session, the AF session change request message may be an STR message that supports the Diameter protocol.

S505. Change context information of the AF session.

In this embodiment, after the routing apparatus receives the AF session change request message sent by the HPCRF entity, the routing apparatus changes the context information of the AF session according to the AF session change request message, for example, modifies the context information of the AF session, or deletes the information corresponding to the bearer in the context information of the AF session.

S506. Send the AF session change request message.

In this embodiment, the routing apparatus sends the AF session change request message to an application server according to the AF session change request message, where the AF session change request message is sent by the routing apparatus according to a change, triggered by the application server, of the AF session. The application server may be an application server of a mobile network operator, or an application server belonging to a third party. The application server may be located at a visited location of UE, or located at another area that is not a home location of the UE. The routing apparatus may be configured by the mobile network operator and have a routing and forwarding function, and furthermore, may further have another function such as protocol conversion, where the protocol conversion may be function conversion between the Diameter protocol and a non-Diameter protocol. For example, the protocol conversion may be conversion between the Diameter protocol and an XML-based protocol, or may be conversion between the Diameter protocol and the HTTP. It should be noted that, the Diameter protocol in this embodiment is consistent with the Diameter protocol in the prior art, and details are not described in this embodiment of the present invention again.

If the application server supports the Diameter protocol, the routing apparatus directly sends the AF session change request message to the application server, that is, the routing apparatus sends the RAR message that supports the Diameter protocol, the STR message that supports the Diameter protocol, or the ASR message that supports the Diameter protocol to the application server. If the application server does not support the Diameter protocol, the routing apparatus converts, according to a non-Diameter protocol type supported by the application server, the RAR message that supports the Diameter protocol, the STR message that supports the Diameter protocol, or the ASR message that supports the Diameter protocol into an AF session modification response message, an AF session termination response message, or an AF session bearer deletion request message that supports the non-Diameter protocol, and then sends the AF session change response message obtained by conversion to the application server.

S507. Send an AF session change response message.

In this embodiment, after receiving the AF session change request message sent by the routing apparatus, the application server sends the AF session change response message to the routing apparatus.

S508. Send the AF session change response message.

In this embodiment, the routing apparatus determines, according to the AF session change response message, the context information of the AF session that needs to be changed, and acquires the IP address of the HPCRF entity stored in the context information of the AF session, and then the routing apparatus sends the AF session change response message to the HPCRF entity according to the IP address of the HPCRF entity. If the change process of the AF session is a termination process of the AF session, the routing apparatus may delete the context information of the AF session.

Optionally, before the routing apparatus sends the AF session change response message to the HPCRF entity, the method further includes: determining, by the routing apparatus, whether the AF session change response message sent by the application server supports the Diameter protocol. If the routing apparatus determines that the AF session change response message supports the Diameter protocol, the AF session change response message is a RAA message that supports the Diameter protocol, a STA message that supports the Diameter protocol, or an ASA (Abort-Session-Answer) message that supports the Diameter protocol, and the routing apparatus may forward the AF session change response message that supports the Diameter protocol to the HPCRF entity. If the routing apparatus determines that the AF session change response message sent by the application server does not support the Diameter protocol, for example, the AF session change response message is an AF session modification response message that supports the non-Diameter protocol, an AF session termination response message that supports the non-Diameter protocol, or an AF session bearer deletion response message that supports the non-Diameter protocol, the routing apparatus converts the AF session change response message that supports the non-Diameter protocol into the AF session change response message that supports the Diameter protocol.

S509. Send a credit control answer (CCA for short) message.

In this embodiment, after receiving the AF session change response message sent by the routing apparatus, the HPCRF entity sends the CCA message to the VPCRF entity. The HPCRF entity may make a PCC rule decision according to the AF session change response message and a local policy, and then send a decided PCC rule to the VPCRF entity by using the CCA message.

S510. Send the CCA message.

In this embodiment, the HPCRF entity sends the decided PCC rule to the VPCRF entity by using the CCA message, and the VPCRF entity forwards the CCA message to the PCEF entity, so that the PCEF entity sets up a PCC rule, modifies a PCC rule, or removes a PCC rule, so as to complete the change process of the AF session.

According to the information transmission method provided in Embodiment 5 of the present invention, after an HPCRF entity acquires an IP address of a routing apparatus via a VPCRF entity, and the routing apparatus acquires an IP address of the HPCRF entity via the VPCRF entity, the HPCRF entity may send an AF session change request message to the routing apparatus according to the IP address of the routing apparatus, and the routing apparatus may receive the AF session change request message that is sent according to the IP address of the routing apparatus by the HPCRF entity; the routing apparatus may send an AF session change response message to the HPCRF entity according to the IP address of the HPCRF entity, and the HPCRF entity may receive the AF session change response message that is sent according to the IP address of the HPCRF entity by the routing apparatus. Therefore, it may be implemented that information transmitted between the HPCRF entity and the routing apparatus no longer needs to be forwarded by the VPCRF entity, but instead, information transmission may be directly performed between the HPCRF entity and the routing apparatus, thereby reducing the amount of information transmitted between the VPCRF entity and the HPCRF entity, so as to reduce signaling overheads and save network resources.

Figure 6:
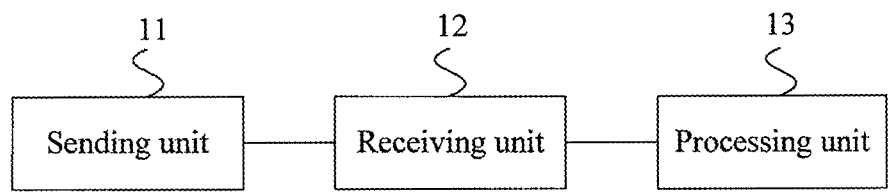
FIG. 6 is a schematic structural diagram of Embodiment 1 of a routing apparatus according to the present invention.

FIG. 6 is a schematic structural diagram of Embodiment 1 of a routing apparatus according to the present invention. As shown in FIG. 6, the apparatus in this embodiment may include: a sending unit 11, a receiving unit 12, and a processing unit 13. The sending unit 11 is configured to send an Internet IP address of the routing apparatus to a home policy and charging rules function HPCRF entity via a visited policy and charging rules function VPCRF entity. The receiving unit 12 is configured to receive, via the VPCRF entity, an IP address of the HPCRF entity sent by the HPCRF entity, where the IP address of the HPCRF entity is sent after the HPCRF entity receives the IP address of the routing apparatus. The processing unit 13 is configured to perform communication with the HPCRF entity according to the IP address of the HPCRF entity and the IP address of the routing apparatus.

The routing apparatus in this embodiment may be configured to execute technical solutions of the foregoing method embodiments of the present invention, and implementation principles and technical effects thereof are similar. For details, reference may be made to related descriptions in the foregoing method embodiments, and details are not described herein again.

Figure 7:
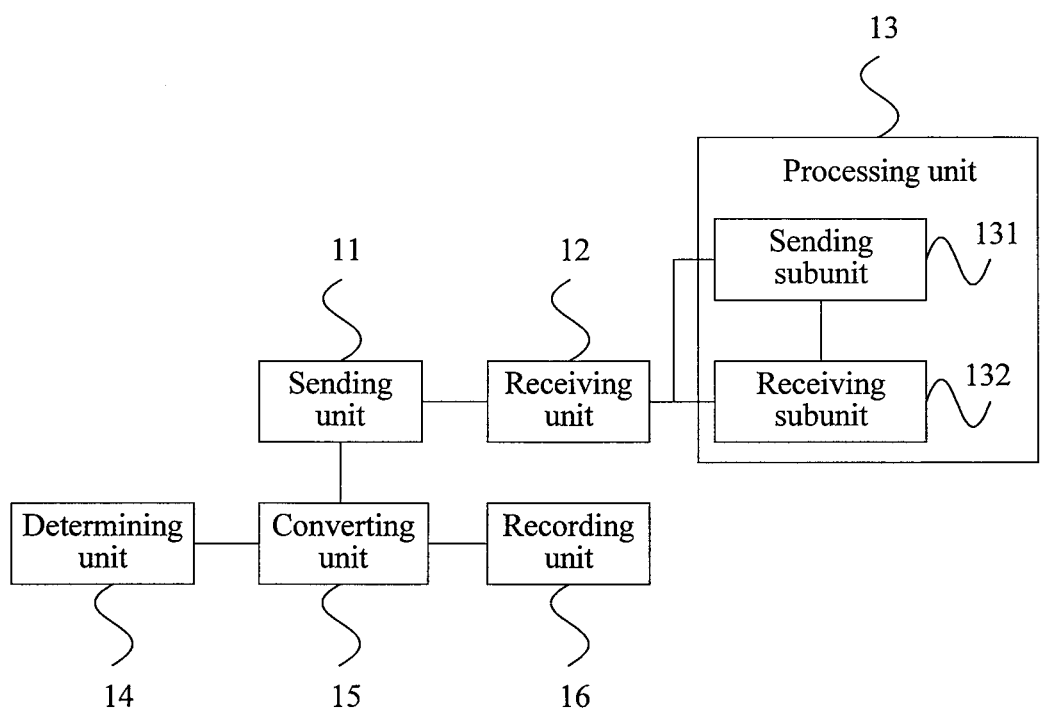
FIG. 7 is a schematic structural diagram of Embodiment 2 of a routing apparatus according to the present invention.

FIG. 7 is a schematic structural diagram of Embodiment 2 of a routing apparatus according to the present invention.

As shown in FIG. 7, in the apparatus in this embodiment, based on a structure of the apparatus shown in FIG. 6, further, the processing unit 13 may include a sending subunit 131 and/or a receiving subunit 132. The sending subunit 131 is configured to send information to the HPCRF entity according to the IP address of the HPCRF entity, and the receiving subunit 132 is configured to receive information that is sent according to the IP address of the routing apparatus by the HPCRF entity.

Optionally, the sending subunit 131 is specifically configured to send the information to the HPCRF entity according to the IP address of the HPCRF entity in a change process of an application function AF session, and the receiving subunit 132 is specifically configured to receive, in the change process of the AF session, the information that is sent according to the IP address of the routing apparatus by the HPCRF entity.

Optionally, the sending unit 11 is specifically configured to send the IP address of the routing apparatus to the HPCRF entity according to a setup process of the AF session via the VPCRF entity, and the receiving unit 12 is specifically configured to receive, according to the setup process of the AF session via the VPCRF entity, the IP address of the HPCRF entity sent by the HPCRF entity.

Optionally, the sending unit 11 is specifically configured to: receive the AF session setup request message sent by an application server, where the AF session setup request message includes information required for setting up the AF session; and send a first setup request message to the VPCRF entity after the routing apparatus sets up context information of the AF session according to the AF session setup request message, where the first setup request message includes the information required for setting up the AF session and the IP address of the routing apparatus, so that the VPCRF entity forwards the first setup request message to the HPCRF entity. The receiving unit 12 is specifically configured to receive a first setup response message sent by the VPCRF entity, where the first setup response message includes the IP address of the HPCRF entity, and the first setup response message is sent to the VPCRF entity after the HPCRF entity sets up context information of the AF session, store the IP address of the HPCRF entity in the context information of the AF session; and send the first setup response message to the application server, so as to complete the setup process of the AF session.

Optionally, the routing apparatus in this embodiment may further include: a determining unit 14, a converting unit 15, and a recording unit 16. The determining unit 14 is configured to: after the routing apparatus sets up the context information of the AF session according to the AF session setup request message and before the sending unit 11 sends the first setup request message to the VPCRF entity, determine whether the AF session setup request message supports the Diameter protocol. The converting unit 15 is configured to: if the determining unit 14 determines that the AF session setup request message does not support the Diameter protocol, convert the AF session setup request into the first setup request message that supports the Diameter protocol; and before the receiving unit 12 sends an AF session first setup response message to the application server, convert, according to a non-Diameter protocol type supported by the application server, the first setup response message that is to be sent to the application server into a message that supports the Diameter protocol. The recording unit 16 is configured to record, according to a protocol type supported by the AF session setup request message, the non-Diameter protocol type supported by the application server.

Optionally, the information required for setting up the AF session includes at least one type of the following information: identifier information of an AF, an IP address of a service IP flow requested by user equipment UE, a port number of the service IP flow requested by the UE, media information of the service IP flow requested by the UE, and an IP address of the UE.

Optionally, the sending subunit 131 is specifically configured to send an AF session change request message to the HPCRF entity according to the IP address of the HPCRF entity stored in the context information of the AF session, so that the HPCRF entity changes the context information of the AF session according to the AF session change request message; where the AF session change request message includes information required for changing the AF session, and the AF session change request message is sent by the routing apparatus according to a change, triggered by the application server, of the AF session, where the change of the AF session is a modification to the AF session or termination of the AF session.

Optionally, the receiving subunit 132 is specifically configured to receive an AF session change response message that is sent according to the IP address of the routing apparatus by the HPCRF entity, where the AF session change response message is sent after the HPCRF entity changes the context information of the AF session according to the AF session change request message; and send the AF session change response message to the application server, so as to complete the change process of the AF session.

Optionally, the receiving subunit 132 is specifically configured to receive an AF session change request message that is sent according to the IP address of the routing apparatus by the HPCRF entity, where the AF session change request message includes information required for changing the AF session, and the AF session change request message is sent by the HPCRF entity according to a change, triggered by a policy and charging enforcement function PCEF entity, of the AF session, where the change of the AF session is a modification to the AF session, termination of the AF session, or deletion of a bearer of the AF session.

Optionally, the sending subunit 131 is specifically configured to send an AF session change response message to the HPCRF entity according to the IP address of the HPCRF entity stored in the context information of the AF session, so as to complete the change process of the AF session, where the AF session change response message is sent after the routing apparatus changes the AF session according to the AF session change request message and after the application server changes the AF session according to the AF session change request message.

The routing apparatus in this embodiment may be configured to execute technical solutions of the foregoing method embodiments of the present invention, and implementation principles and technical effects thereof are similar. For details, reference may be made to related descriptions in the foregoing method embodiments, and details are not described herein again.

Figure 8:
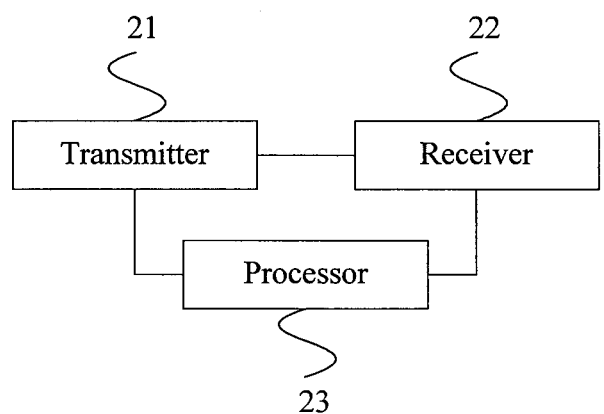
FIG. 8 is a schematic structural diagram of Embodiment 3 of a routing apparatus according to the present invention.

FIG. 8 is a schematic structural diagram of Embodiment 3 of a routing apparatus according to the present invention. As shown in FIG. 8, the routing apparatus in this embodiment may include: a transmitter 21, a receiver 22, and a processor 23. The processor 23 is configured to control the transmitter 21 to send an Internet IP address of the routing apparatus to a home policy and charging rules function HPCRF entity via a visited policy and charging rules function VPCRF entity. The processor 23 is configured to control the receiver 22 to receive, via the VPCRF entity, an IP address of the HPCRF entity sent by the HPCRF entity, where the IP address of the HPCRF entity is sent after the HPCRF entity receives the IP address of the routing apparatus. The processor 23 is configured to perform communication with the HPCRF entity according to the IP address of the HPCRF entity and the IP address of the routing apparatus.

Further, the processor 23 is specifically configured to: control the transmitter 21 to send information to the HPCRF entity according to the IP address of the HPCRF entity, and/or control the receiver 22 to receive information that is sent according to the IP address of the routing apparatus by the HPCRF entity.

Optionally, the processor 23 is specifically configured to control the transmitter 21 to send the information to the HPCRF entity according to the IP address of the HPCRF entity in a change process of an application function AF session, and control the receiver 22 to receive, in the change process of the AF session, the information that is sent according to the IP address of the routing apparatus by the HPCRF entity.

Optionally, the processor 23 is specifically configured to: control the transmitter 21 to send the IP address of the routing apparatus to the HPCRF entity according to a setup process of the AF session via the VPCRF entity, and control the receiver 22 to receive, according to the setup process of the AF session via the VPCRF entity, the IP address of the HPCRF entity sent by the HPCRF entity.

Optionally, the processor 23 is specifically configured to: control the receiver 22 to receive the AF session setup request message sent by an application server, where the AF session setup request message includes information required for setting up the AF session; control the transmitter 21 to send a first setup request message to the VPCRF entity after context information of the AF session is set up according to the AF session setup request message, where the first setup request message includes the information required for setting up the AF session and the IP address of the routing apparatus, so that the VPCRF entity forwards the first setup request message to the HPCRF entity; and control the receiver 22 to receive a first setup response message sent by the VPCRF entity, where the first setup response message includes the IP address of the HPCRF entity, and the first setup response message is sent to the VPCRF entity after the HPCRF entity sets up the context information of the AF session. The processor 23 is further configured to store the IP address of the HPCRF entity in the context information of the AF session; and control the transmitter 21 to send the first setup response message to the application server, so as to complete the setup process of the AF session.

Optionally, the processor 23 is further configured to: after the context information of the AF session is set up according to the AF session setup request message and before the transmitter 21 is controlled to send the first setup request message to the VPCRF entity, determine whether the AF session setup request message supports the Diameter protocol; and if it is determined that the AF session setup request message does not support the Diameter protocol, convert the AF session setup request into the first setup request message that supports the Diameter protocol; record, according to a protocol type supported by the AF session setup request message, a non-Diameter protocol type supported by the application server; and before the transmitter 21 is controlled to send an AF session first setup response message to the application server, convert, according to the non-Diameter protocol type supported by the application server, the first setup response message that is to be sent to the application server into a message that supports the Diameter protocol.

Optionally, the information required for setting up the AF session includes at least one type of the following information: identifier information of an AF, an IP address of a service IP flow requested by user equipment UE, a port number of the service IP flow requested by the UE, media information of the service IP flow requested by the UE, and an IP address of the UE.

Optionally, the processor 23 is specifically configured to control the transmitter 21 to send an AF session change request message to the HPCRF entity according to the IP address of the HPCRF entity stored in the context information of the AF session, so that the HPCRF entity changes the context information of the AF session according to the AF session change request message, where the AF session change request message includes information required for changing the AF session, and the AF session change request message is sent by the routing apparatus according to a change, triggered by the application server, of the AF session, where the change of the AF session is a modification to the AF session or termination of the AF session.

Optionally, the processor 23 is specifically configured to control the receiver 22 to receive an AF session change response message that is sent according to the IP address of the routing apparatus by the HPCRF entity, where the AF session change response message is sent after the HPCRF entity changes the context information of the AF session according to the AF session change request message; and control the transmitter 21 to send the AF session change response message to the application server, so as to complete the change process of the AF session.

Optionally, the processor 23 is specifically configured to control the receiver 22 to receive an AF session change request message that is sent according to the IP address of the routing apparatus by the HPCRF entity, where the AF session change request message includes information required for changing the AF session, and the AF session change request message is sent by the HPCRF entity according to a change, triggered by a policy and charging enforcement function PCEF entity, of the AF session, where the change of the AF session is a modification to the AF session, termination of the AF session, or deletion of a bearer of the AF session.

Optionally, the processor 23 is specifically configured to control the transmitter 21 to send an AF session change response message to the HPCRF entity according to the IP address of the HPCRF entity stored in the context information of the AF session, so as to complete the change process of the AF session, where the AF session change response message is sent after the routing apparatus changes the AF session according to the AF session change request message and after the application server changes the AF session according to the AF session change request message.

The routing apparatus in this embodiment may be configured to execute technical solutions of the foregoing method embodiments of the present invention, and implementation principles and technical effects thereof are similar. For details, reference may be made to related descriptions in the foregoing method embodiments, and details are not described herein again.

Figure 9:
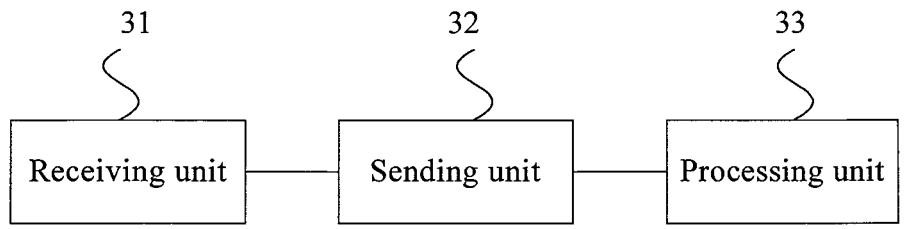
FIG. 9 is a schematic structural diagram of Embodiment 1 of an HPCRF entity according to the present invention.

FIG. 9 is a schematic structural diagram of Embodiment 1 of an HPCRF entity according to the present invention. As shown in FIG. 9, the HPCRF entity in this embodiment may include a receiving unit 31, a sending unit 32, and a processing unit 33. The receiving unit 31 is configured to receive, via a visited policy and charging rules function VPCRF entity, an IP address of a routing apparatus sent by the routing apparatus. The sending unit 32 is configured to send an IP address of the HPCRF entity to the routing apparatus via the VPCRF entity. The processing unit 33 is configured to perform communication with the routing apparatus according to the IP address of the routing apparatus and the IP address of the HPCRF entity.

The HPCRF entity in this embodiment may be configured to execute technical solutions of the foregoing method embodiments of the present invention, and implementation principles and technical effects thereof are similar. For details, reference may be made to related descriptions in the foregoing method embodiments, and details are not described herein again.

Figure 10:
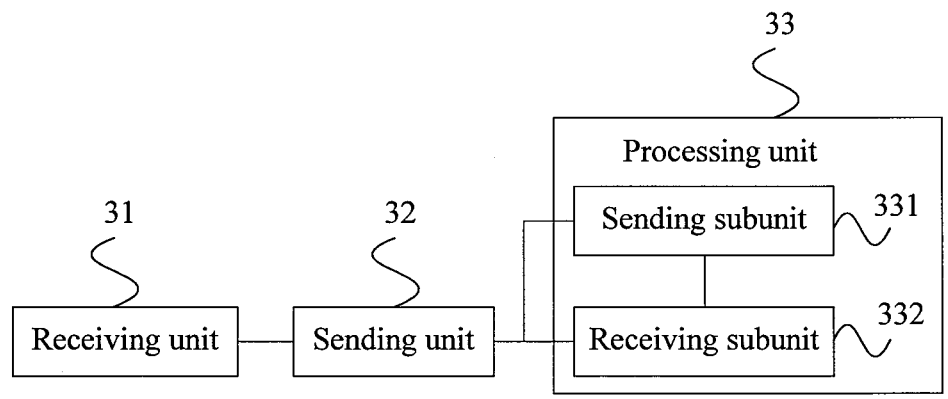
FIG. 10 is a schematic structural diagram of Embodiment 2 of an HPCRF entity according to the present invention.

FIG. 10 is a schematic structural diagram of Embodiment 2 of an HPCRF entity according to the present invention. As shown in FIG. 10, in the HPCRF entity in this embodiment, based on a structure of the apparatus shown in FIG. 9, further, the processing unit 33 may include a sending subunit 331 and/or a receiving subunit 332. The sending subunit 331 is configured to send information to the routing apparatus according to the IP address of the routing apparatus, and the receiving subunit 332 is configured to receive information that is sent according to the IP address of the HPCRF entity by the routing apparatus.

Optionally, the sending subunit 331 is specifically configured to send the information to the routing apparatus according to the IP address of the routing apparatus in a change process of an application function AF session. The receiving subunit 332 is specifically configured to receive, in the change process of the AF session, the information that is sent according to the IP address of the HPCRF entity by the routing apparatus.

Optionally, the receiving unit 31 is specifically configured to receive, according to a setup process of the AF session via the VPCRF entity, the IP address of the routing apparatus sent by the routing apparatus. The sending unit 32 is specifically configured to send the IP address of the HPCRF entity to the routing apparatus according to the setup process of the AF session via the VPCRF entity.

Optionally, the receiving unit 31 is specifically configured to receive a first setup request message sent by the VPCRF entity, where the first setup request message includes information required for setting up the AF session and the IP address of the routing apparatus, and the first setup request message is sent by the routing apparatus to the VPCRF entity according to an AF session setup request message sent by an application server, where the AF session setup request message includes the information required for setting up the AF session; and after the HPCRF entity sets up context information of the AF session according to the first setup request message, store the IP address of the routing apparatus in the context information of the AF session. The sending unit 32 is specifically configured to: after the HPCRF entity sets up the context information of the AF session, send a first setup response message to the VPCRF entity, where the first setup response message includes the IP address of the HPCRF entity, so that the VPCRF entity forwards the first setup response message to the routing apparatus, and then the routing apparatus sends the first setup response message to the application server, so as to complete the setup process of the AF session.

Optionally, the information required for setting up the AF session includes at least one type of the following information: identifier information of an AF, an IP address of a service IP flow requested by user equipment UE, a port number of the service IP flow requested by the UE, media information of the service IP flow requested by the UE, and an IP address of the UE.

Optionally, the receiving subunit 332 is specifically configured to receive an AF session change request message that is sent by the routing apparatus according to the IP address of the HPCRF, where the AF session change request message includes information required for changing the AF session, and the AF session change request message is sent by the routing apparatus according to a change, triggered by the application server, of the AF session, where the change of the AF session is a modification to the AF session or termination of the AF session.

Optionally, the sending subunit 331 is specifically configured to send an AF session change response message to the routing apparatus according to the IP address of the routing apparatus stored in the context information of the AF session, so that the routing apparatus sends the AF session change response message to the application server to complete the change process of the AF session, where the AF session change response message is sent after the HPCRF entity changes the context information of the AF session according to the AF session change request message.

Optionally, the sending subunit 331 is specifically configured to send an AF session change request message to the routing apparatus according to the IP address of the routing apparatus stored in the context information of the AF session, so that the routing apparatus changes the context information of the AF session according to the AF session change request message, where the AF session change request message includes information required for changing the AF session, and the AF session change request message is sent by the HPCRF entity according to a change, triggered by a policy and charging enforcement function PCEF entity, of the AF session, where the change of the AF session is a modification to the AF session, termination of the AF session, or deletion of a bearer of the AF session.

Optionally, the receiving subunit 332 is specifically configured to receive an AF session change response message that is sent according to the IP address of the HPCRF entity by the routing apparatus, where the AF session change response message is sent after the routing apparatus changes the AF session according to the AF session change request message and after the application server changes the AF session according to the AF session change request message; and send the AF session change response message to the PCEF entity via the VPCRF entity, so as to complete the change process of the AF session.

The HPCRF entity in this embodiment may be configured to execute technical solutions of the foregoing method embodiments of the present invention, and implementation principles and technical effects thereof are similar. For details, reference may be made to related descriptions in the foregoing method embodiments, and details are not described herein again.

Figure 11:
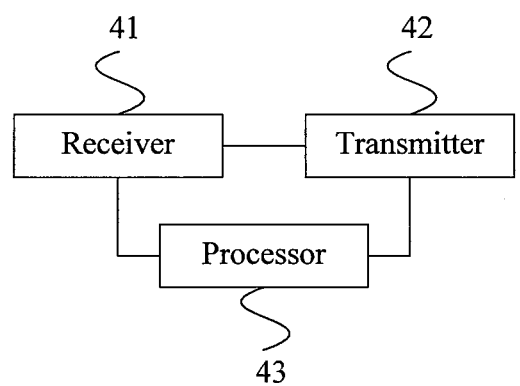
FIG. 11 is a schematic structural diagram of Embodiment 3 of an HPCRF entity according to the present invention.

FIG. 11 is a schematic structural diagram of Embodiment 3 of an HPCRF entity according to the present invention. As shown in FIG. 11, a routing apparatus in this embodiment may include: a receiver 41, a transmitter 42, and a processor 43. The processor 43 is configured to control the receiver 41 to receive, via a visited policy and charging rules function VPCRF entity, an IP address of the routing apparatus sent by the routing apparatus. The processor 43 is configured to control the transmitter 42 to send an IP address of the HPCRF entity to the routing apparatus via the VPCRF entity. The processor 43 is configured to perform communication with the routing apparatus according to the IP address of the routing apparatus and the IP address of the HPCRF entity.

Further, the processor 43 is specifically configured to: control the transmitter 42 to send information to the routing apparatus according to the IP address of the routing apparatus, and/or control the receiver 41 to receive information that is sent according to the IP address of the HPCRF entity by the routing apparatus.

Optionally, the processor 43 is specifically configured to control the transmitter 42 to send the information to the routing apparatus according to the IP address of the routing apparatus in a change process of an application function AF session, and control the receiver 41 to receive, in the change process of the AF session, the information that is sent according to the IP address of the HPCRF entity by the routing apparatus.

Optionally, the processor 43 is specifically configured to control the receiver 41 to receive, according to a setup process of the AF session via the VPCRF entity, the IP address of the routing apparatus sent by the routing apparatus, and control the transmitter 42 to send the IP address of the HPCRF entity to the routing apparatus according to the setup process of the AF session via the VPCRF entity.

Optionally, the processor 43 is specifically configured to control the receiver 41 to receive a first setup request message sent by the VPCRF entity, where the first setup request message includes information required for setting up the AF session and the IP address of the routing apparatus, and the first setup request message is sent by the routing apparatus to the VPCRF entity according to an AF session setup request message sent by an application server, where the AF session setup request message includes the information required for setting up the AF session; and after context information of the AF session is set up according to the first setup request message, store the IP address of the routing apparatus in the context information of the AF session; and after the HPCRF entity sets up the context information of the AF session, control the transmitter 42 to send a first setup response message to the VPCRF entity, where the first setup response message includes the IP address of the HPCRF entity, so that the VPCRF entity forwards the first setup response message to the routing apparatus, and then the routing apparatus sends the first setup response message to the application server, so as to complete the setup process of the AF session.

Optionally, the information required for setting up the AF session includes at least one type of the following information: identifier information of an AF, an IP address of a service IP flow requested by user equipment UE, a port number of the service IP flow requested by the UE, media information of the service IP flow requested by the UE, and an IP address of the UE.

Optionally, the processor 43 is specifically configured to control the receiver 41 to receive an AF session change request message that is sent by the routing apparatus according to the IP address of the HPCRF, where the AF session change request message includes information required for changing the AF session, and the AF session change request message is sent by the routing apparatus according to a change, triggered by the application server, of the AF session, where the change of the AF session is a modification to the AF session or termination of the AF session.

Optionally, the processor 43 is specifically configured to control the transmitter 42 to send an AF session change response message to the routing apparatus according to the IP address of the routing apparatus stored in the context information of the AF session, so that the routing apparatus sends the AF session change response message to the application server to complete the change process of the AF session, where the AF session change response message is sent after the HPCRF entity changes the context information of the AF session according to the AF session change request message.

Optionally, the processor 43 is specifically configured to control the transmitter 42 to send an AF session change request message to the routing apparatus according to the IP address of the routing apparatus stored in the context information of the AF session, so that the routing apparatus changes the context information of the AF session according to the AF session change request message, where the AF session change request message includes information required for changing the AF session, and the AF session change request message is sent by the HPCRF entity according to a change, triggered by a policy and charging enforcement function PCEF entity, of the AF session, where the change of the AF session is a modification to the AF session, termination of the AF session, or deletion of a bearer of the AF session.

Optionally, the processor 43 is specifically configured to control the receiver 41 to receive an AF session change response message that is sent according to the IP address of the HPCRF entity by the routing apparatus, where the AF session change response message is sent after the routing apparatus changes the AF session according to the AF session change request message and after the application server changes the AF session according to the AF session change request message; and control the transmitter 42 to send the AF session change response message to the PCEF entity via the VPCRF entity, so as to complete the change process of the AF session.

The HPCRF entity in this embodiment may be configured to execute technical solutions of the foregoing method embodiments of the present invention, and implementation principles and technical effects thereof are similar. For details, reference may be made to related descriptions in the foregoing method embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. An information transmission method, comprising:
sending, by a routing apparatus, an Internet Protocol (IP) address of the routing apparatus to a home policy and charging rules function (HPCRF) entity via a visited policy and charging rules function (VPCRF) entity, wherein the HPCRF entity is located at a home location with respect to a user equipment (UE) and the VPCRF is not located at the home location with respect to the UE;

receiving, by the routing apparatus via the VPCRF entity, an IP address of the HPCRF entity sent by the HPCRF entity, wherein the IP address of the HPCRF entity is sent after the HPCRF entity receives the IP address of the routing apparatus; and performing, by the routing apparatus, communication with the HPCRF entity according to the IP address of the HPCRF entity and the IP address of the routing apparatus, wherein the routing apparatus communicates with the HPCRF entity and the VPCRF entity via a network.

2. A routing apparatus, comprising:

a transmitter, configured to send an Internet Protocol (IP) address of the routing apparatus to a home policy and charging rules function (HPCRF) entity via a visited policy and charging rules function (VPCRF) entity, wherein the HPCRF entity is located at a home location with respect to a user equipment (UE) and the VPCRF is not located at the home location with respect to the UE;

a receiver, configured to receive, via the VPCRF entity, an IP address of the HPCRF entity sent by the HPCRF entity, wherein the IP address of the HPCRF entity is sent after the HPCRF entity receives the IP address of the routing apparatus; and a processor, connected to communicate with the transmitter and the receiver, configured to perform communication with the HPCRF entity according to the IP address of the HPCRF entity and the IP address of the routing apparatus, wherein the routing apparatus communicates with the HPCRF entity and the VPCRF entity via a network.

3. The routing apparatus according to claim 2, wherein the processor is configured to perform at least one of:

send information to the HPCRF entity according to the IP address of the HPCRF entity;

receive information that is sent according to the IP address of the routing apparatus by the HPCRF entity.

4. The routing apparatus according to claim 3, wherein:

the transmitter is configured to send the information to the HPCRF entity according to the IP address of the HPCRF entity in an application function (AF) session change process; and the receiver is configured to receive, in the AF session change process, the information that is sent according to the IP address of the routing apparatus by the HPCRF entity.

5. The routing apparatus according to claim 4, wherein:

the transmitter is configured to send the IP address of the routing apparatus to the HPCRF entity according to a setup process of the AF session via the VPCRF entity; and the receiver is configured to receive, according to the setup process of the AF session via the VPCRF entity, the IP address of the HPCRF entity sent by the HPCRF entity.

6. The routing apparatus according to claim 5, wherein:

the receiver is configured to receive an AF session setup request message sent by an application server, wherein the AF session setup request message comprises information required for setting up the AF session;

the transmitter is configured to send a first setup request message to the VPCRF entity after the routing apparatus sets up context information of the AF session according to the AF session setup request message, wherein the first setup request message comprises the information required for setting up the AF session and the IP address of the routing apparatus, so that the VPCRF entity forwards the first setup request message to the HPCRF entity;

the receiver is configured to receive a first setup response message sent by the VPCRF entity, wherein the first setup response message comprises the IP address of the HPCRF entity, and the first setup response message is sent to the VPCRF entity after the HPCRF entity sets up context information of the AF session;

the processor is configured to store the LP address of the HPCRF entity in the context information of the AF session; and the transmitter is configured to send the first setup response message to the application server, so as to complete the setup process of the AF session.

7. The routing apparatus according to claim 6, wherein the processor is further configured to:

after the routing apparatus sets up the context information of the AF session according to the AF session setup request message and before the transmitter sends the first setup request message to the VPCRF entity, determine whether the AF session setup request message supports Diameter protocol;

if the processor determines that the AF session setup request message does not support the Diameter protocol, convert the AF session setup request into the first setup request message that supports the Diameter protocol;

before the receiver sends an AF session first setup response message to the application server, convert, according to a non-Diameter protocol type supported by the application server, the first setup response message that is to be sent to the application server into a message that supports the Diameter protocol; and record, according to a protocol type supported by the AF session setup request message, the non-Diameter protocol type supported by the application server.

8. The routing apparatus according to claim 6, wherein the transmitter is configured to send an AF session change request message to the HPCRF entity according to the IP address of the HPCRF entity stored in the context information of the AF session, so that the HPCRF entity changes the context information of the AF session according to the AF session change request message, wherein the AF session change request message comprises information required for changing the AF session, and the AF session change request message is sent by the routing apparatus according to a change, triggered by the application server, of the AF session, wherein the change of the AF session is a modification to the AF session or termination of the AF session.

9. The routing apparatus according to claim 8, wherein:

the receiver is configured to receive an AF session change response message that is sent according to the IP address of the routing apparatus by the HPCRF entity, wherein the AF session change response message is sent after the HPCRF entity changes the context information of the AF session according to the AF session change request message; and the transmitter is configured to send the AF session change response message to the application server, so as to complete the AF session change process.

10. The routing apparatus according to claim 6, wherein the receiver is configured to receive an AF session change request message that is sent according to the IP address of the routing apparatus by the HPCRF entity, wherein the AF session change request message comprises information required for changing the AF session, and the AF session change request message is sent by the HPCRF entity according to a change, triggered by a policy and charging enforcement function (PCEF) entity, of the AF session, wherein the change of the AF session is a modification to the AF session, or termination of the AF session, or deletion of a bearer of the AF session.

11. The routing apparatus according to claim 10, wherein the transmitter is configured to send an AF session change response message to the HPCRF entity according to the IP address of the HPCRF entity stored in the context information of the AF session, so as to complete the AF session change process, wherein the AF session change response message is sent after the routing apparatus changes the AF session according to the AF session change request message and after the application server changes the AF session according to the AF session change request message.

12. A home policy and charging rules function (HPCRF) entity, comprising:
- a receiver, configured to receive, via a visited policy and charging rules function (VPCRF) entity, an Internet Protocol (IP) address of a routing apparatus sent by the routing apparatus, wherein the HPCRF entity is located at a home location with respect to a user equipment (UE) and the VPCRF is not located at the home location with respect to the UE;
- a transmitter, configured to send an IP address of the HPCRF entity to the routing apparatus via the VPCRF entity; and
- a processor, connected to communicate with the transmitter and the receiver, configured to perform communication with the routing apparatus according to the IP address of the routing apparatus and the IP address of the HPCRF entity, wherein the HPCRF entity communicates with the routing apparatus and the VPCRF entity via a network.

13. The HPCRF entity according to claim 12, wherein the processor is configured to perform at least one of:
- send information to the routing apparatus according to the IP address of the routing apparatus; and
- receive information that is sent according to the IP address of the HPCRF entity by the routing apparatus.

14. The HPCRF entity according to claim 13, wherein:
- the transmitter is configured to send the information to the routing apparatus according to the IP address of the routing apparatus in an application function (AF) session change process; and
- the receiver is configured to receive, in the AF session change process, the information that is sent according to the IP address of the HPCRF entity by the routing apparatus.

15. The HPCRF entity according to claim 14, wherein:
- the receiver is configured to receive, according to a setup process of the AF session via the VPCRF entity, the IP address of the routing apparatus sent by the routing apparatus; and
- the transmitter is configured to send the IP address of the HPCRF entity to the routing apparatus according to the setup process of the AF session via the VPCRF entity.

16. The HPCRF entity according to claim 15, wherein:
- the receiver is configured to receive a first setup request message sent by the VPCRF entity, wherein the first setup request message comprises information required for setting up the AF session and the IP address of the routing apparatus, and the first setup request message is sent by the routing apparatus to the VPCRF entity according to an AF session setup request message sent by an application server, wherein the AF session setup request message comprises the information required for setting up the AF session;
- after the HPCRF entity sets up context information of the AF session according to the first setup request message, the processor is configured to store the IP address of the routing apparatus in the context information of the AF session; and
- the transmitter is configured to: after the HPCRF entity sets up the context information of the AF session, send a first setup response message to the VPCRF entity, wherein the first setup response message comprises the IP address of the HPCRF entity, so that the VPCRF entity forwards the first setup response message to the routing apparatus, and the routing apparatus sends the first setup response message to the application server, so as to complete the setup process of the AF session.

17. The HPCRF entity according to claim 16, wherein the receiver is configured to receive an AF session change request message that is sent by the routing apparatus according to the IP address of the HPCRF, wherein the AF session change request message comprises information required for changing the AF session, and the AF session change request message is sent by the routing apparatus according to a change, triggered by the application server, of the AF session, wherein the change of the AF session is a modification to the AF session or termination of the AF session.

18. The HPCRF entity according to claim 17, wherein the transmitter is configured to send an AF session change response message to the routing apparatus according to the IP address of the routing apparatus stored in the context information of the AF session, so that the routing apparatus sends the AF session change response message to the application server to complete the AF session change process, wherein the AF session change response message is sent after the HPCRF entity changes the context information of the AF session according to the AF session change request message.

19. The HPCRF entity according to claim 16, wherein the transmitter is configured to send an AF session change request message to the routing apparatus according to the IP address of the routing apparatus stored in the context information of the AF session, so that the routing apparatus changes the context information of the AF session according to the AF session change request message, wherein the AF session change request message comprises information required for changing the AF session, and the AF session change request message is sent by the HPCRF entity according to a change, triggered by a policy and charging enforcement function (PCEF) entity, of the AF session, wherein the change of the AF session is a modification to the AF session, termination of the AF session, or deletion of a bearer of the AF session.

20. The HPCRF entity according to claim 19, wherein:
- the receiver is configured to receive an AF session change response message that is sent according to the IP address of the HPCRF entity by the routing apparatus, wherein the AF session change response message is sent after the routing apparatus changes the AF session according to the AF session change request message and after the application server changes the AF session according to the AF session change request message; and the transmitter is configured to send the AF session change response message to the PCEF entity via the VPCRF entity, so as to complete the AF session change process.

\* \* \* \* \*